(12) United States Patent
Tong et al.

(10) Patent No.: US 12,490,200 B2
(45) Date of Patent: Dec. 2, 2025

(54) TRANSMIT POWER ADJUSTING METHOD

(71) Applicant: TP-LINK CORPORATION LIMITED, Hong Kong (CN)

(72) Inventors: Di Tong, Shenzhen (CN); Wanyi Li, Shenzhen (CN)

(73) Assignee: TP-LINK CORPORATION LIMITED, Hong Kong (CN)

( * ) Notice: Subject to any disclaimer, the term of this patent is extended or adjusted under 35 U.S.C. 154(b) by 0 days.

(21) Appl. No.: 19/015,514

(22) Filed: Jan. 9, 2025

(65) Prior Publication Data

US 2025/0150977 A1 May 8, 2025

Related U.S. Application Data

(63) Continuation of application No. PCT/CN2023/107740, filed on Jul. 17, 2023.

(30) Foreign Application Priority Data

Aug. 4, 2022 (CN) .................. 202210932018.X
Aug. 4, 2022 (CN) .................. 202210933105.7

(51) Int. Cl.
*H04W 52/22* (2009.01)
*H04W 52/24* (2009.01)
*H04W 52/38* (2009.01)

(52) U.S. Cl.
CPC ......... *H04W 52/22* (2013.01); *H04W 52/242* (2013.01); *H04W 52/383* (2013.01)

(58) Field of Classification Search
CPC . H04W 74/08; H04W 74/0833; H04W 84/12; H04W 48/16; H04W 12/08;
(Continued)

(56) References Cited

U.S. PATENT DOCUMENTS

2015/0319700 A1 11/2015 Oteri
2017/0164387 A1 6/2017 Lou
(Continued)

FOREIGN PATENT DOCUMENTS

CN 102026359 A 4/2011
CN 102026359 B 10/2014
(Continued)

OTHER PUBLICATIONS

3GPP TSG RAN meeting #66, RP-141816 "Status Report to TSG, Study on Licensed-Assisted Access to Unlicesned Spectrum", Dec. 8-11, 2014, 15 pages, logged Dec. 2, 2014, last accessed at https://www.3gpp.org/ftp/tsg_ran/TSG_RAN/TSGR_66/Docs.
(Continued)

*Primary Examiner* — Tu X Nguyen
(74) *Attorney, Agent, or Firm* — Loeb & Loeb LLP

(57) ABSTRACT

The present disclosure provides a transmit power adjusting method, including: sending, in response to a successful contention for a channel, a target frame including a transmit power control (TPC) report control field, wherein the target frame is any one of QoS Data frame, QoS Null frame and management frame, and the TPC report control field indicates a first transmit power for transmitting the target frame; and receiving a MAC layer protocol data unit (MPDU), wherein a second transmit power for transmitting the MPDU is at least partially based on the first transmit power.

5 Claims, 6 Drawing Sheets

(58) Field of Classification Search
CPC . H04W 74/04; H04W 74/0836; H04W 52/34; H04W 52/32; H04W 52/38; H04W 52/08; H04W 52/00; H04W 52/12; H04W 52/54; H04W 52/58; H04W 52/26; H04W 52/18; H04W 52/04; H04W 52/545; H04W 52/06; H04W 92/18; H04W 52/383
See application file for complete search history.

(56) References Cited

U.S. PATENT DOCUMENTS

| | | |
|---|---|---|
| 2018/0332540 A1 | 11/2018 | Lou |
| 2019/0373537 A1 | 12/2019 | Trainin |
| 2020/0344677 A1 | 10/2020 | Cherian |

FOREIGN PATENT DOCUMENTS

| | | |
|---|---|---|
| CN | 105379395 A | 3/2016 |
| CN | 105743628 | 7/2016 |
| CN | 108055879 A | 5/2018 |
| CN | 108432299 A | 8/2018 |
| CN | 109194454 A | 1/2019 |
| CN | 109891951 | 6/2019 |
| CN | 108432299 B | 8/2021 |
| CN | 114071579 | 2/2022 |
| CN | 114125968 | 3/2022 |
| CN | 114302496 A | 4/2022 |
| CN | 115413007 A | 11/2022 |
| CN | 115474264 A | 12/2022 |
| EP | 3107340 A1 | 12/2016 |

OTHER PUBLICATIONS

Chinese First Office Action (with English translation) issued in CN202210932018.X, dated Jun. 28, 2024, 13 pages.
Chinese First Office Action (with English translation) issued in CN202210933105.7, dated Jun. 28, 2024, 8 pages.
Chinese Second Office Action (with English translation) issed in CN202210932018.X, dated Dec. 20, 2024, 15 pages.
PCT/CN2023/107740 Written Opinion of the International Searching Authority and International Search Report, dated Nov. 7, 2023, with English Translation, 15 pages.

TRANSMIT POWER ADJUSTING METHOD

CROSS-REFERENCE TO RELATED APPLICATION(S)

The present disclosure is a continuation of International Patent Application No. PCT/CN2023/107740, filed on Jul. 17, 2023, which claims the priority of China Patent Application No. 202210932018.X and No. 202210933105.7 both filed on Aug. 4, 2022, the entirety of both are incorporated hereby by reference herein.

TECHNICAL FIELD

The present disclosure belongs to the technical field of communication, and particularly to a transmit power adjusting method and a computer-readable storage medium.

BACKGROUND

Transmit power control (TPC) in Wi-Fi 5G band, which is a technology for adjusting transmit power of wireless network devices, is designed to ensure the quality and stability of the communications between devices, while avoiding interference with other devices or the surrounding environment. TPC technology dynamically adjusts transmit power of device by measuring factors such as quality of signal and environmental noise, so as to maintain the quality of signal within an acceptable range.

However, in the case that a link between an AP and an STA changes, the current TPC scheme will lead the STA to fail to report TPC information timely. In addition, under the current TPC scheme, the AP can only request TPC information from one STA at one time, which is very inefficient in acquisition of TPC information. Therefore, it is necessary to improve the existing transmit power control.

SUMMARY in a first aspect, an embodiment of the present disclosure provides a transmit power adjusting method, comprising: sending, in response to a successful contention for a channel, a target frame including a transmit power control (TPC) report control field, wherein the target frame is any one of Quality of Service (QOS) data frame, QoS null frame and management frame, and the TPC report control field indicates a first transmit power for transmitting the target frame; and receiving a MAC layer protocol data unit (MPDU), wherein a second transmit power for transmitting the MPDU is at least partially based on the first transmit power.

In a second aspect, an embodiment of the present disclosure provides a transmit power adjusting method, comprising: sending any one of a basic trigger frame, a buffer status report poll trigger frame, a beamforming report poll trigger frame and a bandwidth query report poll trigger frame; receiving a response frame including a TPC report control field indicating a first transmit power for transmitting the response frame; and transmitting an MPDU with a second transmit power which is at least partially based on the first transmit power.

In a third aspect, an embodiment of the present disclosure provides a transmit power adjusting method, comprising: sending a TPC report poll trigger frame which is used to trigger a plurality of STAs to report TPC report information; receiving a plurality of response frames including a TPC report control field indicating a first transmit power for transmitting the response frame; and transmitting an MPDU with a second transmit power which is at least partially based on the first transmit power.

In a fourth aspect, an embodiment of the present disclosure provides a computer-readable storage medium having stored thereon a computer program which, when executed by a processor, implements the steps of any of the above smart antenna scheduling method.

BRIEF DESCRIPTION OF DRAWINGS

In order to illustrate the embodiments of the present disclosure or the technical schemes in the prior art more clearly, the drawings needed to be used in the description of the embodiments or the prior art will be briefly introduced one by one below. Obviously, the drawings in the following description are some of the embodiments of the present disclosure, and according to these drawings, other drawings may be further obtained without creative work for those ordinary skilled in the art. In the drawings.

DETAILED DESCRIPTION

Figure 1:
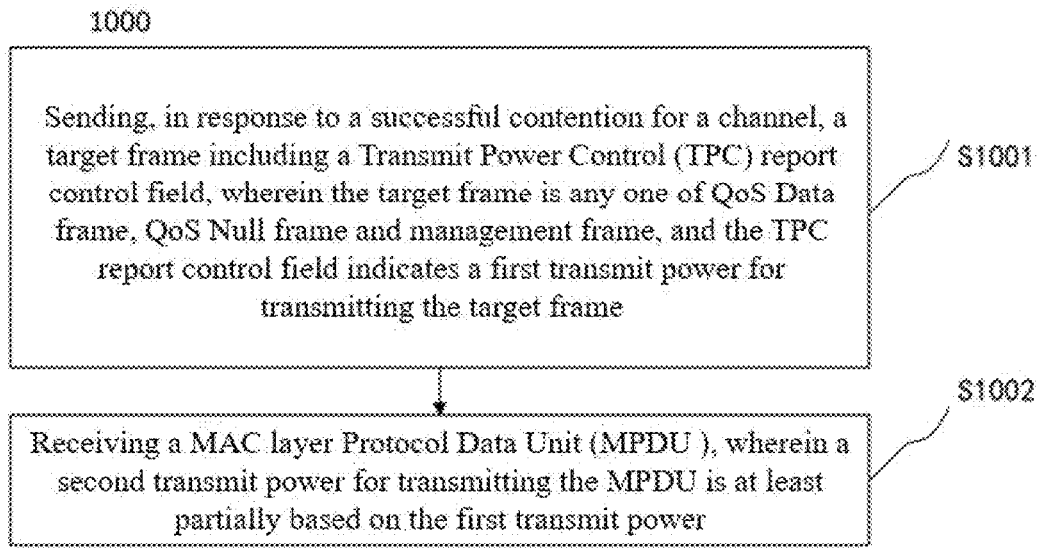
FIG. 1 is a flowchart of a transmit power adjusting method provided according to an embodiment of the present disclosure.

In order to make the purposes, technical schemes and advantages of the embodiments of the present disclosure more clear, a clear and complete description will be made with respect to the technical schemes in the embodiments of the present disclosure in conjunction with the drawings in the embodiments of the present disclosure. Obviously, the described embodiments are only part of the embodiments of the present disclosure, but not all of the embodiments. All other embodiments obtained by those ordinary skilled in the art based on the embodiments in the present disclosure without creative labor belong to the protection scope of the present disclosure.

Terms such as "first", "second", "third" and "fourth", if any, in the specification and claims of the present disclosure and the above drawings, are used to distinguish similar objects, and are not necessarily used to describe a specific sequence or order. It should be understood that the data used as such may be interchanged when appropriate, so that the embodiments of the present disclosure described herein may be implemented in other sequences than those illustrated or described herein.

It should be understood that in various embodiments of the present disclosure, the sequence number of each process does not mean the order of execution, and the order of execution of each process should be determined according to its function and internal logic, and should not constitute any limitation on the implementation process of the embodiments of the present disclosure.

It should be understood that in the present disclosure, "including" and "having" and any variations thereof are intended to cover non-exclusive inclusion, for example, a process, method, system, product or device that contains a series of steps or units is not necessarily limited to those explicitly listed, but may include other steps or units not explicitly listed or inherent to these processes, methods, products or devices.

It should be understood that in the present disclosure, "plural" refers to two or more. "and/or" is merely an association describing associated objects, which indicates that there may be three kinds of relationships, for example, "A and/or B" may indicate three situations: A alone, both A and B, and B alone. The character "/" generally indicates an "or" relationship between the preceding and following objects associated thereby. "containing A, B and C" and "containing A, B, C" mean containing all of A, B and C, "containing A, B or C" means containing one of A, B and C, and "containing A, B and/or C" means including any one or two or three of A, B and C.

It should be understood that in the present disclosure, "A corresponds to B", "B corresponding to A", "A corresponds to B" or "B corresponds to A" indicates that B is associated with A, and B may be determined according to A. Determining B according to A does not mean determining B only according to A, but determining B according to A and/or other information. A match between A and B means that the similarity between A and B is greater than or equal to a preset threshold.

Depending on the context, "if" as used herein may be interpreted as "when" or "while" or "in response to determining that . . . " or "in response to detecting . . . ".

The technical schemes of the present disclosure will be described in detail with specific examples. The following specific embodiments may be combined with each other, and the same or similar concepts or processes may not be detailed in some embodiments.

In order to make the purposes, technical schemes and advantages of the present disclosure more clear, illustrations will be made below by specific embodiments in conjunction with the drawings.

According to the current IEEE 802.11 protocol, devices (including AP and STA) operating in the 5 GHz band are required to have a function of transmit power control (TPC), so as to meet the requirements of the regulatory domains. The TPC function requires control of a transmitter's transmit power, so that the transmitter's transmit power may meet a limit of maximum transmit power stipulated by the regulatory domains and a local constraint of maximum transmit power. The transmit power used by the STA should be less than or equal to the local maximum transmit power level for the channel, and the transmit power of the AP should be less than or equal to the regulatory maximum transmit power level for the channel, and meet any regulatory mitigation requirements. After determining the current regulatory maximum transmit power for the channel and the current local maximum transmit power for the channel, the device should perform spectrum management operations as required, including transmit power control and other services. Such operations are intended to guarantee the compliance and stability of the device in the 5 GHz band.

At present, in general, a TPC report is requested by an AP from an STA, to obtain TPC information of the STA, and in turn a transmit power of an MPDU for message transmission to the STA is dynamically adjusted through the TPC information. However, if the link between the AP and the STA changes, the STA may not be able to report the TPC information timely, leading to a problem that the transmit power of the MPDU for message transmission to the STA cannot be adjusted. In addition, the AP may usually only send a TPC request frame or a link measurement request frame to one STA at one time, to obtain the TPC information of that STA. Such a scheme is not suitable for a scenario where an AP requests TPC information from multiple STAs at the same time.

For this reason, there are proposed various embodiments of the present disclosure, and the current transmission mechanism of TPC information is improved according to the various embodiments of the present disclosure, so that the AP or STA may report the TPC information more timely and actively, thereby adaptively adjusting the transmit power.

Figure 2:
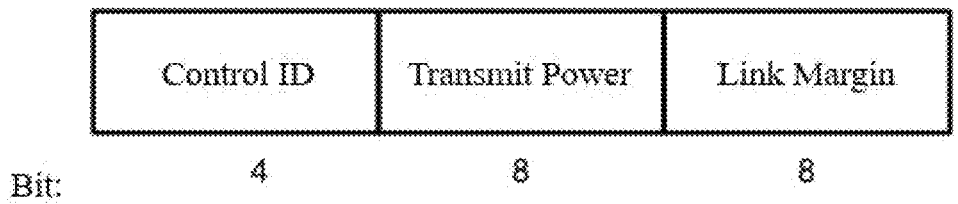
FIG. 2 is a structural diagram of a TPC report control field provided by an embodiment of the present disclosure.

FIG. 1 is a flowchart of a transmit power adjusting method provided according to an embodiment of the present disclosure. FIG. 2 is a structural diagram of a TPC report control field provided by an embodiment of the present disclosure.

In an embodiment according to the present disclosure, as shown in FIG. 1, there is provided a transmit power adjusting method 1000. The execution subject of method 1000 may be either an AP (Access Point) or an STA (Station).

Illustrations are made by taking AP (Access Point) as an example of the execution subject of method 1000. AP is a wireless network device, which is used to convert wired network connections into wireless signals so that wireless devices may connect to a network. AP may provide wireless network coverage, allowing multiple wireless devices to be connected to a network (e.g., a Wi-Fi network) at the same time. AP is the creator of a wireless network and the central node of a network. The wireless router used in general homes or offices is an AP. Optionally, method 100 includes the following operations S1001 to S1002.

Operation S1001: sending, in response to a successful contention for a channel, a target frame including a TPC report control field, wherein the target frame is any one of QoS Data frame, QoS Null frame and management frame, and the TPC report control field indicates a first transmit power for transmitting the target frame.

Optionally, the AP may successfully contend for a channel through EDCA (Enhanced Distribution Channel Access). EDCA is a kind of wireless local area network (WLAN) protocol, for regulating channel access between multiple wireless devices. In EDCA, each of the wireless devices is assigned a priority, according to which its right to access the channel is determined. The process of successfully contending for a channel means that when a device wants to send data, it will check whether the channel is available, and if the channel is idle, the device will perform a random backoff process to acquire access to the channel. In EDCA, a device with a higher priority will have a greater probability of obtaining access to the channel to ensure the priority of its data transmission. Of course, the present disclosure is not limited to this.

Optionally, after successfully contending for the channel through EDCA, the AP may further determine whether it is necessary to actively send TPC report information to the STA. STA is every terminal connected to the wireless network (such as laptop, PAD and other user equipment that may be networked), which may also be referred to as a station. For example, the AP may determine whether it is necessary to send TPC report information to the STA through a target frame based on whether a preset time is reached. Among other things, the preset time refers to a time at which the TPC information is reported, which may be set according to specific needs. If the TPC information needs to be reported at 12 o'clock and 16 o'clock every day, the preset time is set to 12 o'clock and 16 o'clock. If the TPC information needs to be reported once every 30 minutes, it may be set that a next reporting time is 30 minutes later than a previous reporting time. For another example, the AP may determine whether it is necessary to send TPC report information to the STA through a target frame based on whether the link condition changes. If the AP determines that the link changes, it may send TPC report information to the STA through a target frame. Of course, the present disclosure is not limited to this.

Optionally, the first transmit power is the transmit power of the AP. An example of the TPC report control field may be shown in FIG. 2. The TPC report control field includes control ID and TPC report information. The TPC report information includes first transmit power (the transmit power in FIG. 2, e.g., denoted by 8 bits) and link margin information (e.g., represented by 8 bits). Among other things, the control ID indicates that this field is a TPC report control field. The transmit power field is set to the transmit power used to transmit the target frame. The link margin field indicates a link margin for the reception time and the reception rate of the frame containing the TPC report request. It should be noted that although the TPC report control field is mainly used to indicate the TPC report information, in the present disclosure, the link margin information may also be a reserved field, so that the first transmit power is reported only through the TPC report control field. Of course, the present disclosure is not limited to this.

Optionally, the TPC report control field exists in a target frame, that is, QoS Data frame, QoS Null frame and management frame. Among other things, QoS data frame and QoS Null frame are both data frames. Data frame is responsible for carrying data, and will put the data of the upper layer protocol in the frame body for transfer. Both QoS data frame and QoS Null frame include frame control field, duration field, address field and sequence control field. The QoS subfield in the subtype field of the frame control field of QoS data frame and QoS Null frame indicates that there is a QoS control field in this data frame. Management frames are usually responsible for supervising, and are mainly used to join or quit the wireless network and handle the associated transfer between access points. Management frame also includes frame control field, duration field, address field and sequence control field. Of course, the present disclosure is not limited to this.

Optionally, a +HTC/Order subfield in the frame control field of the QoS Data frame, QoS Null frame and management frame indicates an existence of HT (High Throughput) control field, and bits B0 and B1 of the HT control field are both 1, indicating that the HT control field is an HE variant. The A-Control subfield (i.e., bits B2-B31 of the HT control field) in the HT control field of the QoS Data frame, QoS Null frame and management frame includes the TPC report control field. The A-Control subfield includes 30 bits, containing a control list of variable length. The control list includes one or more control subfields. Each of the control subfields includes control ID and variable-length control information. Specifically, the first 4 bits of each of the control subfields (i.e., bits B0-B3 of the control subfield) indicate the control ID. More specifically, in an alternative embodiment according to the present disclosure, the control ID of the control subfield, as shown in FIG. 2, includes 4 bits, whose value may be any of 7-14. The control information of the control subfield includes the TPC report information as shown in FIG. 2, which includes a first transmit power denoted by 8 bits and a link margin denoted by 8 bits. Of course, the present disclosure is not limited to this.

Optionally, the TPC report control field may also be located in the A-Control subfield of the HT control field in a Control Wrapper frame. A control Wrapper frame is a kind of control frame. If a control frame is described as XX+HTC (e.g., RTS+HTC, CTS+HTC, BlockAck+HTC, etc.), it means that this control frame is carried using a Control Wrapper frame. Similarly, in this example, the A-Control subfield of the HT control field in the Control Wrapper frame also includes 30 bits. The control list in the A-Control subfield may include a control ID with a value of any of 7-14, and its control information includes the TPC report control field as shown in FIG. 2. Of course, the present disclosure is not limited to this.

Operation S1002: receiving an MPDU (MAC Protocol Data Unit), wherein a second transmit power for transmitting the MPDU is at least partially based on the first transmit power.

Optionally, in data communication, MPDU refers to a data packet transmitted in MAC layer, including MAC layer protocol header and data payload. MPDU, which is data generated by upper layer application, is delivered to MAC layer for processing after being processed by TCP/IP protocol stack, and is then sent to the receiver through physical layer. The length of MPDU depends on the size of the data load and the length of the MAC layer protocol header. Of course, the present disclosure is not limited to this.

Optionally, after receiving the target frame, the STA parses the target frame to obtain the TPC report control field, extracts the first transmit power from the TPC report control field, then calculates a difference between the first transmit power and the received power of the target frame, and finally takes the difference as the path loss to adjust the second transmit power through the path loss. Then the MPDU is transmitted to the AP with the second transmit power.

Therefore, method 1000 according to the embodiment of the present disclosure causes the AP side to actively report the TPC report information to the STA side, so that the STA side may adjust the second transmit power based on the first transmit power in the TPC report information. Thus, method 1000 according to the embodiment of the present disclosure realizes an unsolicited TPC reporting mechanism that in a case of occurrence of link failure or reaching of a preset time, the AP may automatically report the TPC information timely, so that the STA may in turn adaptively adjust the transmit power.

Next, illustrations are made by taking STA as an example of the execution subject of method 1000.

Operation S1001: sending, in response to a successful contention for a channel, a target frame including a TPC report control field, wherein the target frame is any one of QoS Data frame, QoS Null frame and management frame, and the TPC report control field indicates a first transmit power for transmitting the target frame.

Optionally, the STA may also successfully contend for a channel through EDCA (Enhanced Distribution Channel Access). After the STA successfully contends for the channel through EDCA, the STA may further determine whether it is necessary to actively send TPC report information to the AP. For example, the STA may determine whether it is necessary to send TPC report information to the AP through a target frame based on whether a preset time is reached. Among other things, the preset time refers to a time at which the TPC information is reported, which may be set according to specific needs. If the TPC information needs to be reported at 12 o'clock and 16 o'clock every day, the preset time is set to 12 o'clock and 16 o'clock. If the TPC information needs to be reported once every 30 minutes, it may be set that a next reporting time is 30 minutes later than a previous reporting time. For another example, the STA may determine whether it is necessary to send TPC report information to the AP through a target frame based on whether the link changes. If the STA determines that the link changes, it may send TPC report information to the AP through a target frame. Of course, the present disclosure is not limited to this.

Similarly, the first transmit power is the transmit power of the STA. An example of the TPC report control field may be shown in FIG. 2. The TPC report control field includes control ID and TPC report information. The TPC report information includes a first transmit power (the transmit power in FIG. 2) and link margin information. Among other things, the control ID field indicates that the type of variant is TPC report control variant. The transmit power field is set to the transmit power used to transmit the target frame. The link margin field indicates a link margin for the reception time and the reception rate of the frame containing the TPC report request. It should be noted that although the TPC report control field is mainly used to indicate the TPC report information, in the present disclosure, the link margin information may also be a reserved field, so that the first transmit power is reported only through the TPC report control field. Of course, the present disclosure is not limited to this.

Optionally, a +HTC/Order subfield in the frame control field of the QoS Data frame, QoS Null frame and management frame indicates an existence of HT (High Throughput) control field, and bits B0 and B1 of the HT control field are both 1, indicating that the HT control field is an HE variant. The A-Control subfield (i.e., bits B2-B31 of the HT control field) in the HT control field of the QoS Data frame, QoS Null frame and management frame includes the TPC report control field. Of course, the present disclosure is not limited to this.

Operation S1002: receiving an MPDU (MAC Protocol Data Unit), wherein a second transmit power for transmitting the MPDU is at least partially based on the first transmit power.

Optionally, after receiving the target frame, the AP parses the target frame to obtain the TPC report control field, extracts the value of the first transmit power from the TPC report control field, then calculates a difference between the first transmit power and the received power of the target frame, and finally takes the difference as the path loss to adjust the second transmit power through the path loss. Then, the MPDU is transmitted to the STA with the second transmit power. Of course, the present disclosure is not limited to this.

Therefore, method 1000 according to the embodiment of the present disclosure causes the STA to successfully contend for the channel, and actively report the TPC report information to the AP side, and enables the AP to adjust the second transmit power based on the first transmit power in the TPC report information. Thus, method 1000 according to the embodiment of the present disclosure realizes an unsolicited TPC reporting mechanism that in a case of occurrence of link failure or reaching a preset time, the STA may automatically report the TPC information timely, so that the AP may in turn adaptively adjust the transmit power.

Figure 3:
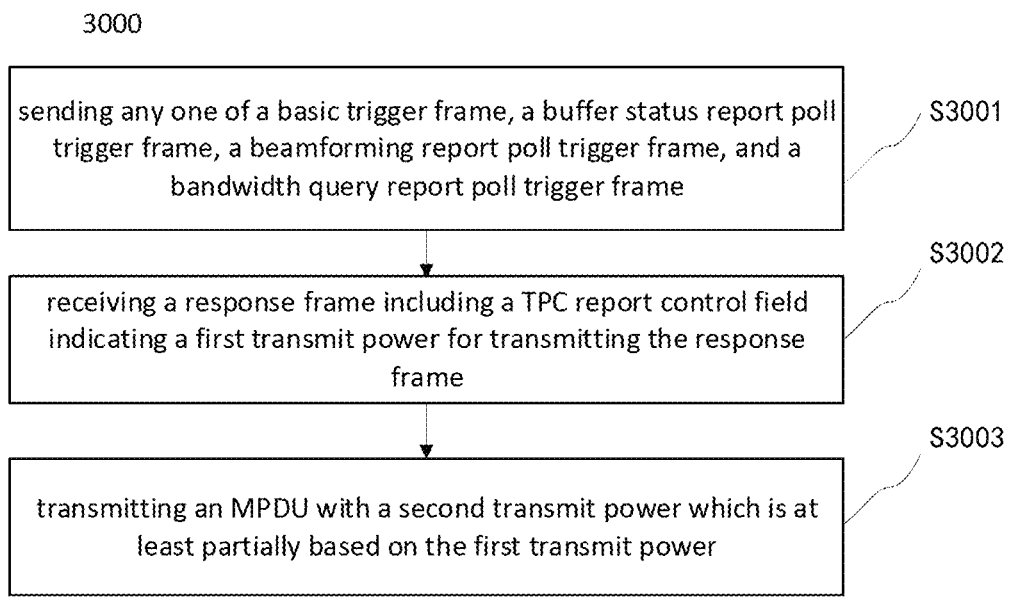
FIG. 3 is a flowchart of yet another transmit power adjusting method provided according to an embodiment of the present disclosure.

FIG. 3 is a flowchart of yet another transmit power adjusting method provided according to an embodiment of the present disclosure.

In an embodiment according to the present disclosure, as shown in FIG. 3, there is provided a transmit power adjusting method 3000. In the following example, the execution subject of method 3000 is an AP. Optionally, method 3000 includes the following operations S3001 to S3003.

Operation S3001: sending any one of a basic trigger frame, a buffer status report poll trigger frame, a beamforming report poll trigger frame, and a bandwidth query report poll trigger frame.

Optionally, the basic trigger frame, buffer status report poll trigger frame, beamforming report poll trigger frame, and bandwidth query report poll trigger frame do not need to explicitly indicate that the STA should report TPC report information. For example, the buffer status report poll trigger frame is used to request from multiple STAs buffer status reports as a response, and the bandwidth query report poll trigger frame is used to request from multiple STAs bandwidth information as a response. Of course, the present disclosure is not limited to this.

Operation S3002: receiving a response frame including a TPC report control field indicating a first transmit power for transmitting the response frame.

Optionally, the response frame, which may be a response to any one of the basic trigger frame, buffer status report poll trigger frame, beamforming report poll trigger frame and bandwidth query report poll trigger frame, may be an HE TB PPDU (high efficiency trigger-based physical layer protocol data unit). HE TB PPDU, which is a kind of data frame format defined in IEEE 802.11ax standard, has higher data transmission efficiency and more control options. For example, the TPC report control field may be located in the control field of HE TB PPDU. The format of the TPC report control field, as shown in FIG. 2, includes control ID and TPC report information. The TPC report information includes a first transmit power (the transmit power in FIG. 2) and link margin information. The TPC report control field has been previously described in detail with reference to FIG. 2, and thus will not be detailed here in the present disclosure.

Optionally, upon receiving any one of the basic trigger frame, buffer status report poll trigger frame, beamforming report poll trigger frame and bandwidth query report poll trigger frame, in addition to generating a response required by such trigger frames, the STA will further determine whether it is necessary to actively report TPC information to the AP. For example, the STA may determine whether it is necessary to send TPC report information to the AP based on whether a preset time is reached. Among other things, the preset time refers to a time at which the TPC information is reported, which may be set according to specific needs. If the TPC information needs to be reported at 12 o'clock and 16 o'clock every day, the preset time is set to 12 o'clock and 16 o'clock. If the TPC information needs to be reported once every 30 minutes, it may be set that the next reporting time is 30 minutes later than a previous reporting time. For another example, the STA may determine whether it is necessary to send TPC report information to the AP through a target frame based on whether the link changes. If the STA determines that the link changes, it may send TPC report information to the AP through a target frame. Of course, the present disclosure is not limited to this.

Operation S3003: transmitting an MPDU with a second transmit power which is at least partially based on the first transmit power.

Optionally, after receiving the response frame, the AP parses the response frame to obtain the TPC report control field, extracts the first transmit power from the TPC report control field, then calculates a difference between the first transmit power and the received power of the response frame, and finally takes the difference as the path loss to adjust the second transmit power through the path loss. Then, the MPDU is transmitted to the STA with the second transmit power.

Therefore, method 3000 according to the embodiment of the present disclosure causes the STA to actively report the TPC report information to the AP side by means of the occasion for sending the response frame, enables the AP to adjust the second transmit power based on the first transmit power in the TPC report information. Thus, method 3000 according to the embodiment of the present disclosure realizes an unsolicited TPC reporting mechanism that in a case of occurrence of link failure or reaching a preset time, the STA may automatically report the TPC information timely, so that the AP may in turn adaptively adjust the transmit power.

Figure 4A:
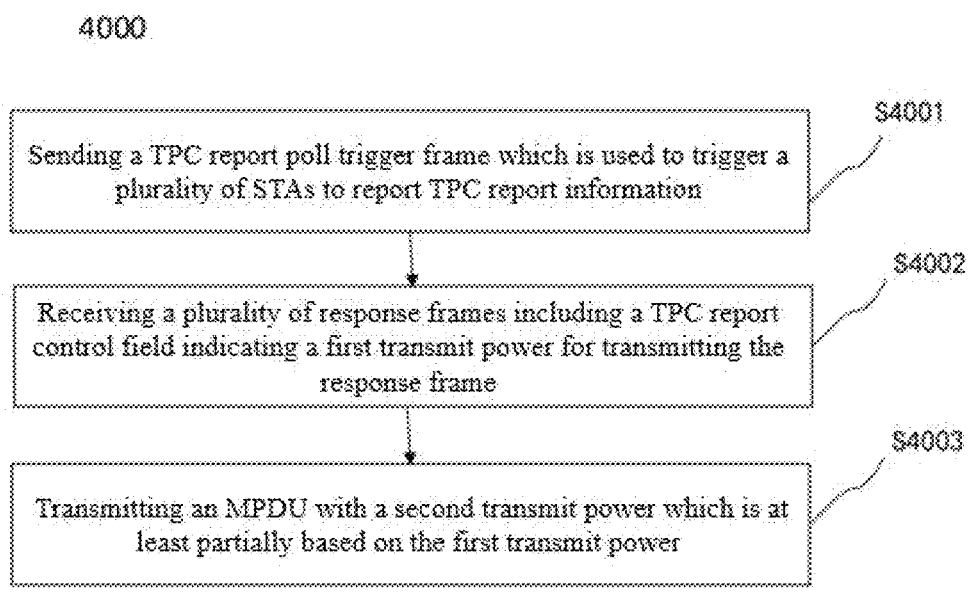
FIG. 4A is a flowchart of yet another transmit power adjusting method provided according to an embodiment of the present disclosure.
Figure 4B:
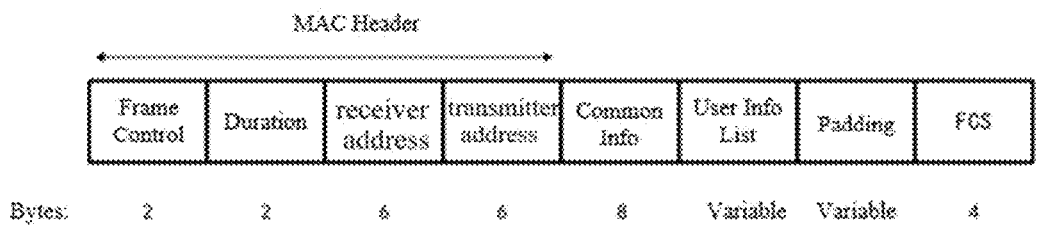
FIG. 4B is a structural diagram of a TPC report poll trigger frame according to an embodiment of the present disclosure.

FIG. 4A is a flowchart of yet another transmit power adjusting method provided according to an embodiment of the present disclosure. FIG. 4B is a structural diagram of a TPC report poll trigger frame according to an embodiment of the present disclosure.

In an embodiment according to the present disclosure, as shown in FIG. 4A, there is provided a transmit power adjusting method 4000. In the following example, the execution subject of method 4000 is an AP. Optionally, method 4000 includes the following operations S4001 to S4003.

Operation S4001: sending a TPC report poll trigger frame which is used to trigger a plurality of STAs to report TPC report information.

Optionally, the TPC report poll trigger frame is determined by adjusting the format of the basic trigger frame originally defined in the protocol. As shown in FIG. 4B, the TPC report poll trigger frame includes frame control field, duration field, receiver address, transmitter address, common information field, user information list, padding field and FCS field.

Optionally, the frame control field is used to indicate information such as protocol version, frame type/subtype (indicating that the type of frame is control frame and the subtype is trigger frame). The duration field indicates the duration of the next frame exchange sequence. The receiver address is set as a broadcast address. The transmitter address is set as the address of the sender. The common information field indicates the type of the trigger frame, the length information of the requested HE TB PPDU, the uplink bandwidth, as well as the transmit power of the AP, so the process may not only request the STA to send a TPC report, but also indirectly indicate a TPC report to the STA. Among other things, no Trigger Dependent Common Information (TDCI) subfield exists in the common information field, and the trigger type subfield in the common information field indicates that the trigger frame is a TPC report poll trigger frame.

Optionally, the user list information indicates some of user information of all the STAs that are triggered to send a TPC report, such as AID information, RU allocation information, MCS information, etc. Among other things, no Trigger Dependent User Information (TDUI) subfield exists in the user information list. The padding field optionally exists in the trigger frame to extend the frame length, so as to leave the receiver STAs enough time to send a response at SIFS time after receiving the frame. The FCS (Frame Check Sequence) field is used for frame check.

Operation S4002: receiving a plurality of response frames including a TPC report control field indicating a first transmit power for transmitting the response frame.

Optionally, after receiving the TPC report poll trigger frame sent by the AP, the STA sequentially determines whether the TPC report poll trigger frame is supported, and whether the TPC report poll trigger frame contains the 12 LSBs of the AID corresponding to the STA. In the case that the results of the above judgment are both yes, the STA generates an HE TB PPDU, so that the STA may report the TPC report information to the AP through the TPC report control field.

The STA sequentially determines whether the TPC report poll trigger frame is supported, and whether the TPC report poll trigger frame contains the 12 LSBs of the AID corresponding to STA. If the STA supports TPC report poll trigger frame and the TPC report poll trigger frame contains the 12 LSBs of the AID corresponding to the STA, the STA reports the TPC report information to the AP. If the STA does not support TPC report poll trigger frame, the STA does not respond to the trigger frame, in which case the AP may request TPC report information using the request frame defined in the protocol, such as by sending a TPC request frame or a link measurement request frame. Of course, the present disclosure is not limited to this.

Optionally, the response frame is an HE TB PPDU, wherein the HE TB PPDU includes TPC report control field, through which the STA reports TPC report information to the AP, and the TPC report information includes the first transmit power for transmitting the response frame. Of course, the present disclosure is not limited to this.

Optionally, among other things, the format of the TPC report control field is shown in FIG. 2. Optionally, upon receiving the TPC report poll trigger frame sent by the AP, the STA records the received level of the TPC report poll trigger frame as P_RX1, and its own receiver sensitivity as Rx_Sensitivity, that is, the link margin LinkMargin=P_RX1−Rx_Sensitivity. Next, the STA fills its own transmit power and the link margin into the TPC report information. The TPC report control field has been previously described in detail with reference to FIG. 2, and thus will not be detailed here in the present disclosure.

Operation S4003: transmitting an MPDU with a second transmit power which is at least partially based on the first transmit power.

Optionally, transmitting an MPDU with a second transmit power comprises: determining a path loss based on the first transmit power in the TPC report control field and the receive power of the response frame; determining a link margin based on a link margin field in the TPC report information; and determining a second transmit power based on the path loss and the link margin.

Optionally, after the AP receives the HE TB PPDU sent by the STA, since the HE TB PPDU includes the TPC report control field, the AP directly parses the HE TB PPDU to obtain the TPC report control field, and in turn, determines the TPC report information through the transmit power field and link margin field in the TPC report control field. For example, the AP will extract the transmit power (i.e., the first transmit power) from the TPC report information, then calculate a second difference between the transmit power and the received power of the HE TB PPDU, and take the second difference as the path loss. Specifically, let the transmit power indicated in the TPC report control field reported by the STA be P_TX, and the received power of the HE TB PPDU be P_RX2, the path loss power P_L=P_TX−P_RX2. Thus, the AP may determine the second transmit power based on the path loss power and the information in the link margin field.

For another example, if the AP finds that the information in the link margin field is NULL, the AP may also determine the link margin by the following scheme comprising: calculating a first difference between the received level of the TPC report poll trigger frame and the sensitivity of the receiver receiving the TPC report poll trigger frame, and taking the first difference as the link margin. Thus, the AP may determine the second transmit power based on the path loss power and the calculated link margin. Of course, the present disclosure is not limited to this.

Therefore, method 4000 according to the embodiment of the present disclosure enables the AP to request TPC information from a plurality of associated STAs at the same time, thereby avoiding unnecessary consumption of links.

Figure 5:
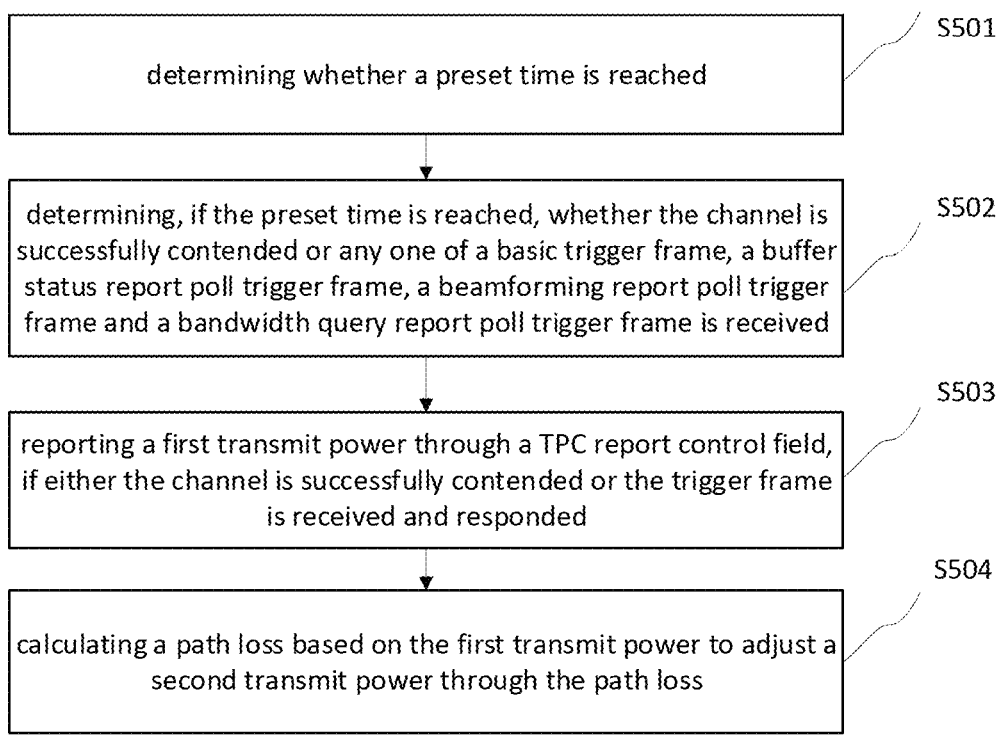
FIG. 5 is an implementation flowchart of a transmit power adjusting method provided according to an embodiment of the present disclosure.
Figure 6:
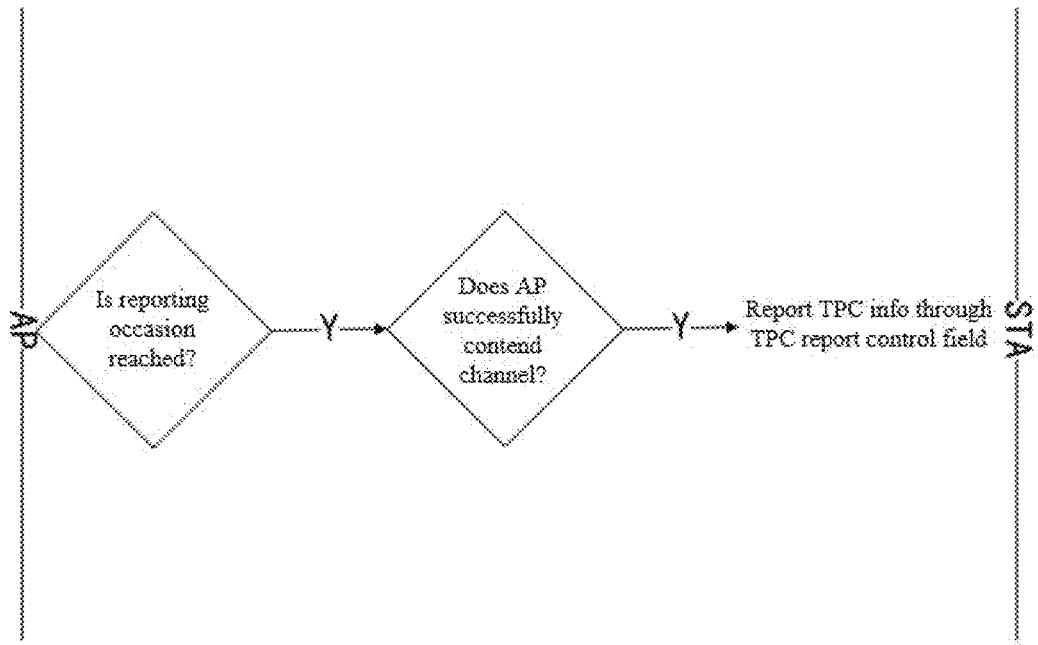
FIG. 6 is an implementation flowchart of a transmit power adjusting method provided according to an embodiment of the present disclosure.
Figure 7:
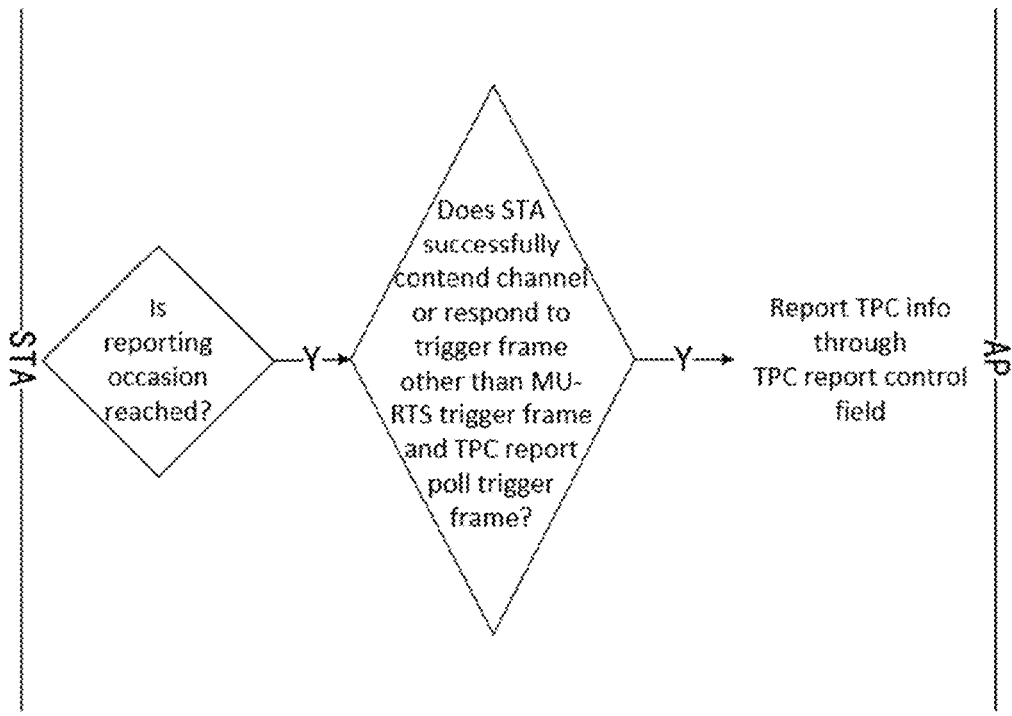
FIG. 7 is yet another implementation flowchart of a transmit power adjusting method provided according to an embodiment of the present disclosure.

Next, some specific embodiments of the present disclosure are further described in conjunction with FIGS. 5 to 9. Among other things, FIG. 5 is an implementation flowchart of a transmit power adjusting method provided according to an embodiment of the present disclosure. FIG. 6 is an implementation flowchart of a transmit power adjusting method provided according to an embodiment of the present disclosure. FIG. 7 is another implementation flowchart of a transmit power adjusting method provided according to an embodiment of the present disclosure.

As shown in FIG. 5, the present disclosure also provides a transmit power adjusting method 50, which comprises the following steps.

Step S501: determining whether a preset time is reached.

Among other things, the preset time refers to a time at which the TPC information is reported, which may be set according to specific needs. If the TPC information needs to be reported at 12 o'clock and 16 o'clock every day, the preset time is set to 12 o'clock and 16 o'clock. If the TPC information needs to be reported once every 30 minutes, it may be set that a next reporting time is 30 minutes later than a previous reporting time.

Step S502: determining, if the preset time is reached, whether the channel is successfully contended or any one of a basic trigger frame, a buffer status report poll trigger frame, a beamforming report poll trigger frame and a bandwidth query report poll trigger frame is received.

For the periodical active reporting of TPC information according to the embodiment of the present disclosure, it is necessary to first perform judgment with respect to time, and if the preset time is reached, and then to determine whether the channel is successfully contended or any one of basic trigger frame, buffer status report poll trigger frame, beamforming report poll trigger frame and bandwidth query report poll trigger frame is received, so that the TPC report control field containing the TPC information is set in different types of frames to report TPC information. Among other things, if the channel is successfully contended, the TPC report control field may be set in such as data frame, by means of active reporting. If any one of the basic trigger frame, buffer status report poll trigger frame, beamforming report poll trigger frame and bandwidth query report poll trigger frame is received, it is necessary to respond according to any one of the basic trigger frame, buffer status report poll trigger frame, beamforming report poll trigger frame and bandwidth query report poll trigger frame, so as to set the TPC report control field in the response frame.

Step S503: reporting a first transmit power through a TPC report control field, if either the channel is successfully contended or the trigger frame is received and responded;

Step S504: calculating a path loss based on the first transmit power to adjust a second transmit power through the path loss.

The present disclosure sets two sides, respectively the AP side and the STA side. According to the present disclosure, in a case of a successful contention for either of the channel and the response target frame, the AP side and the STA side may report the first transmit power through the TPC report control field without requesting mutually, so as to adjust the second transmit power based on the first transmit power, which ensures that even in a case of occurrence of link failure, the first transmit power may be reported timely, so as to realize self-adaptive adjustment of the second transmit power.

Since the TPC report control field may actively indicate the TPC report information, the TPC report control field may be set in the target frame or response frame, to achieve the goal of actively reporting the TPC report information to adjust the second transmit power.

The mutual reporting of TPC report information between the AP and the STA comprises two cases: in the first case, the AP side actively reports the TPC report information to the STA side, so that the STA side may adjust the second transmit power based on the first transmit power in the TPC report information; and in the second case, the STA side actively reports the TPC report information to the AP side, so that the AP side may adjust the second transmit power based on the first transmit power in the TPC report information.

In a specific embodiment, in conjunction with FIG. 6, the execution steps of the AP side actively reporting the TPC report information to the STA side, so that the STA side may adjust the second transmit power based on the first transmit power in the TPC report information comprise that: if the AP successfully contends for the channel through EDCA, it sends a target frame to the STA, and after receiving the target frame, the STA parses the target frame to obtain the TPC report control field, extracts the first transmit power from the TPC report control field, then calculate a difference between the first transmit power and the received power of the target frame, and finally take the difference as the path loss to adjust the second transmit power through the path loss, wherein the second transmit power is used to characterize the transmit power for message transmission to the peer device. Among other things, the target frame includes at least one of QoS Data frame, QoS Null frame and management frame.

There are two approaches for the STA side to actively report the TPC report information to the AP side, so that the AP side may adjust the second transmit power based on the first transmit power in the TPC report information: in the first approach, the STA successfully contends for the channel and actively reports the TPC report information to the AP side, so that the AP side may adjust the second transmit power based on the first transmit power in the TPC report information; and in the second approach, the STA actively reports, in response to a trigger frame, the TPC report information to the AP side, so that the AP side may adjust the second transmit power based on the first transmit power in the TPC report information.

In a specific embodiment, with reference to FIG. 7, the execution steps of the STA successfully contending for the channel and actively reporting the TPC report information to the AP side, so that the AP side may adjust the second transmit power based on the first transmit power in the TPC report information comprise that: if the STA successfully contends for the channel through EDCA, it sends a target frame to the AP, and after receiving the target frame, the AP parses the target frame to obtain the TPC report control field, extracts the first transmit power from the TPC report control field, then calculate a difference between the first transmit power and the received power of the target frame, and finally takes the difference as the path loss to adjust the second transmit power through the path loss, wherein the second transmit power is used to characterize the transmit power for message transmission to the peer device. Among other things, the target frame includes at least one of QoS Data frame, QoS Null frame and management frame.

In another specific embodiment, in conjunction with FIG. 7, the execution steps of the STA actively reporting, in response to a trigger frame, the TPC report information to the AP side, so that the AP side may adjust the second transmit power based on the first transmit power in the TPC report information comprises that: if the STA sends, in response to the trigger frame, a response frame corresponding to the trigger frame to the AP, and after receiving the response frame, the AP parses the response frame to obtain the TPC report control field, extracts the first transmit power from the TPC report control field, then calculate a difference between the first transmit power and the received power of the response frame, and finally take the difference as the path loss to adjust the second transmit power through the path loss, wherein the second transmit power is used to characterize the transmit power for message transmission to the peer device. Among other things, the response frame, which is a trigger frame other than MU-RTS trigger frame and TPC report poll trigger frame, may be basic trigger frame, buffer status report poll trigger frame, bandwidth query report poll trigger frame and the like.

It should be noted that, in the above embodiment, if the TPC report information sent by the AP is received by the STA, the second transmit power is used to characterize the transmit power for message transmission to the peer device, wherein the peer device refers to the AP associated with the STA; or if the TPC report information sent by the STA is received by the AP, the second transmit power is used to characterize the transmit power for message transmission to the peer device, wherein the peer device refers to the STA associated with the AP.

In method 50 according to the embodiment of the present disclosure, the TPC information is actively reported through the TPC report control field without requesting the AP or STA, to acquire the first transmit power timely and adjust the second transmit power based on the first transmit power, wherein the TPC information includes first transmit power, which ensures that the transmit power may be adaptively adjusted even in a case of occurrence of link failure.

Figure 8:
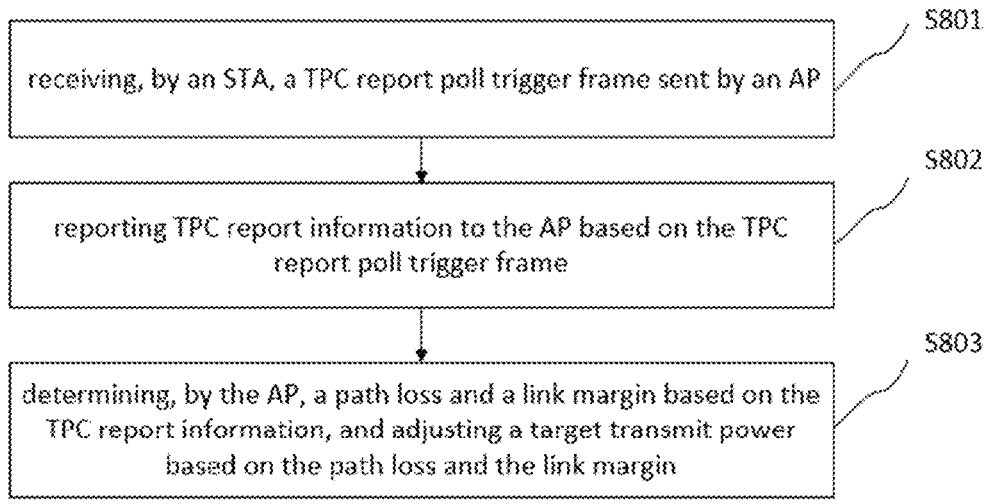
FIG. 8 is an implementation flowchart of a transmit power adjusting method according to an embodiment of the present disclosure.
Figure 9:
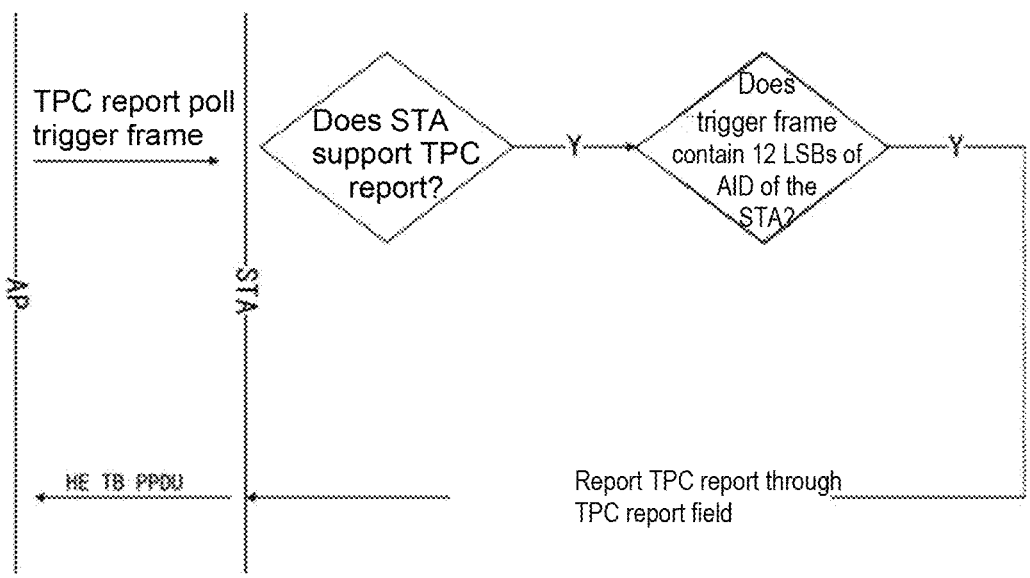
FIG. 9 is an implementation diagram of a transmit power adjusting method according to an embodiment of the present disclosure.

FIG. 8 is an implementation flowchart of a transmit power adjusting method according to an embodiment of the present disclosure. FIG. 9 is an implementation diagram of a transmit power adjusting method according to an embodiment of the present disclosure.

As shown in FIG. 8, there is provided a transmit power adjusting method 80 comprising the following steps.

Step S801: receiving, by an STA, a TPC report poll trigger frame sent by an AP. The details of the TPC report poll trigger frame have been described in detail with reference to FIG. 4B, and will not be detailed here in the present disclosure.

Step S802: reporting TPC report information to the AP based on the TPC report poll trigger frame.

In conjunction with FIG. 9, after receiving the TPC report poll trigger frame sent by the AP, the STA sequentially determines whether the TPC report poll trigger frame is supported, and whether the TPC report poll trigger frame contains the 12 LSBs of the AID corresponding to the STA. In the case that the results of the above judgment are both yes, the STA generates an HE TB PPDU, so that the STA may report the TPC report information to the AP through the TPC report control field.

The specific execution steps of the STA sequentially judging whether the TPC report poll trigger frame is supported, and whether the TPC report poll trigger frame contains the 12 LSBs of the AID corresponding to the STA are as follows: the STA determines whether the TPC report poll trigger frame is supported and obtains a first judgment result, and then reports the TPC report information to the AP based on the first judgment result.

Further, the reporting the TPC report information to the AP based on the first judgment result comprises that: if the first judgment result is yes, the STA determines whether the TPC report poll trigger frame contains the 12 LSBs of the AID corresponding to the STA and obtains a second judgment result, and then reports the TPC report information to the AP based on the second judgment result; and if the first judgment result is no, the STA does not respond to the trigger frame, in which case the AP may request TPC report information using the request frame defined in the protocol, such as by sending a TPC request frame or a link measurement request frame.

Furthermore, the reporting the TPC report information to the AP based on the second judgment result comprises that: if the second judgment result is yes, the STA generates an HE TB PPDU, wherein the HE TB PPDU includes TPC report control field, and then the STA reports the TPC report information to the AP through the TPC report control field.

Step S803: determining, by the AP, a path loss and a link margin based on the TPC report information, and adjusting a target transmit power based on the path loss and the link margin, wherein the target transmit power is used to characterize the transmit power for message transmission to the STA.

After the AP receives the HE TB PPDU sent by the STA, since the HE TB PPDU includes the TPC report control field, the AP directly parses the HE TB PPDU to obtain the TPC report control field, and in turn determines the TPC report information through the transmit power field and link margin field in the TPC report control field.

In order to realize adaptive adjustment of transmit power for message transmission to the STA, the STA needs to determine link margin information, and the AP needs to determine path loss based on the TPC report information.

For the determination of path loss, the path loss may be determined based on the TPC report information and the received power of the HE TB PPDU. The execution steps are as follows: firstly, extracting the transmit power from the TPC report information, and then calculating a second difference between the transmit power and the received power of the HE TB PPDU, and taking the second difference as the path loss.

Specifically, let the transmit power indicated in the TPC report control field reported by the STA be P_TX, and the received power of the HE TB PPDU be P_RX1, the path loss power P_L=P_TX−P_RX1.

For the determination of link margin, the execution steps are as follows: calculating a first difference between the received level of the TPC report poll trigger frame and the sensitivity of the receiver receiving the TPC report poll trigger frame, and taking the first difference as the link margin.

Specifically, upon receiving the TPC report poll trigger frame sent by the AP, the STA records the received level of the TPC report poll trigger frame as P_RX2, and its own receiver sensitivity as Rx_Sensitivity, that is, the link margin LinkMargin=P_RX2−Rx_Sensitivity.

Therefore, the embodiment of the present disclosure provides a transmit power adjusting method, comprising that: an STA receives a TPC report poll trigger frame sent by an AP, reports TPC report information to the AP based on the TPC report poll trigger frame, then the AP determines a path loss and a link margin based on the TPC report information, and adjusts a target transmit power based on the path loss and the link margin. In the present disclosure, an AP may send a TPC report poll trigger frame to one or more STAs at the same time, to acquire the TPC information reported by one or more STAs, determine the path loss and the link margin based on the TPC information, and in turn may adjust the target transmit power based on the path loss and the link margin, which is not only suitable for a scenario where an AP requests TPC information from multiple associated STAs at the same time, but also avoids unnecessary consumption of links.

In addition, the present disclosure also provides a transmit power adjusting apparatus comprising a first judging module, a second judging module, a power reporting module and a power adjusting module, specifically as follows: the first judging module, configured to determine whether a preset time is reached; the second judging module, configured to determine, if the preset time is reached, either whether a channel is successfully contended or whether a trigger frame is received and responded; the power reporting module, configured to report, if either the channel is successfully contended or the trigger frame is received and responded, a first transmit power through a TPC report control field; the power adjusting module, configured to calculate a path loss based on the first transmit power, to adjust a second transmit power through the path loss.

In one possible implementation, the power reporting module includes: a first sending submodule, configured to send a target frame to the STA if the AP successfully contends for the channel through EDCA; a first parsing submodule, configured to parse, after the STA receives the target frame, the target frame to obtain the TPC report control field; a first information extracting submodule, configured to extract the first transmit power from the TPC report control field.

In one possible implementation, the power reporting module includes: a second sending submodule, configured to send a target frame to the AP if the STA successfully contends for the channel through EDCA; a second parsing submodule, configured to parse, after the AP receives the target frame, the target frame to obtain the TPC report control field; a second information extracting submodule, configured to extract the first transmit power from the TPC report control field.

In one possible implementation, the power adjusting module includes: a first calculating submodule, configured to calculate a difference between the first transmit power and the received power of the target frame; a first adjusting submodule, configured to take the difference as the path loss, to adjust the second transmit power through the path loss, wherein the second transmit power is used to characterize the transmit power for message transmission to the peer device.

In one possible implementation, the target frame includes at least one of QoS Data frame, QoS Null frame and management frame.

In one possible implementation, the power reporting module includes: a third sending module, configured to send a response frame corresponding to the trigger frame to the AP if the STA responds to the trigger frame; a third parsing module, configured to parse, after the AP receives the response frame, the response frame to obtain the TPC report control field; a third information extracting module, configured to extract the first transmit power from the TPC report control field. In one possible implementation, the power adjusting module 54 includes: a second calculating submodule, configured to calculate a difference between the first transmit power and the received power of the response frame; a second adjusting submodule, configured to take the difference as the path loss, to adjust the second transmit power through the path loss, wherein the second transmit power is used to characterize the transmit power for message transmission to the peer device.

In one possible implementation, the TPC report control field includes control ID, first transmit power and link margin information.

In addition, the present disclosure also provides a transmit power adjusting apparatus comprising a request receiving module, an information reporting module and a power adjusting module, specifically as follows: the request receiving module, configured to receive for the STA a TPC report poll trigger frame sent by the AP; the information reporting module, configured to report TPC report information to the AP based on the TPC report poll trigger frame; the power adjusting module, configured to determine for the AP a path loss and a link margin based on the TPC report information, and adjust a target transmit power based on the path loss and the link margin, wherein the target transmit power is used to characterize the transmit power for message transmission to the STA.

In one possible implementation, the information reporting module includes: a judging submodule, configured to determine for the STA whether the TPC report poll trigger frame is supported and obtain a first judgment result; a decision-making submodule, configured to report the TPC report information to the AP based on the first judgment result. In one possible implementation, the decision-making submodule includes: a judging unit, configured to determine for the STA, if the first judgment result is yes, whether the TPC report poll trigger frame contains the 12 LSBs of the AID corresponding to the STA, and obtains a second judgment result; a decision-making unit, configured to report the TPC report information to the AP based on the second judgment result.

In one possible implementation, the decision-making unit includes: a generating subunit, configured to generate for the STA an HE TB PPDU if the second judgment result is yes, wherein the HE TB PPDU includes TPC report control field; a reporting subunit, configured to report for the STA the TPC report information to the AP through the TPC report control field.

In one possible implementation, the power adjusting module includes: a path loss calculating submodule, configured to determine the path loss based on the TPC report information and the received power of the HE TB PPDU; a link margin acquiring submodule, configured to read a link margin field in the TPC report information and determine the link margin based on the link margin field; and a power adjusting submodule, configured to adjust the target transmit power based on the path loss and the link margin. In one possible implementation, the path loss calculating submodule includes: a power extracting unit, configured to extract a transmit power from the TPC report information; a path loss calculating unit, configured to calculate a second difference between the transmit power and the received power of the HE TB PPDU, and takes the second difference as the path loss.

In one possible implementation, the TPC report poll trigger frame includes frame control field, duration field, receiver address, transmitter address, common information field, user information list, padding field and FCS field.

Figure 10:
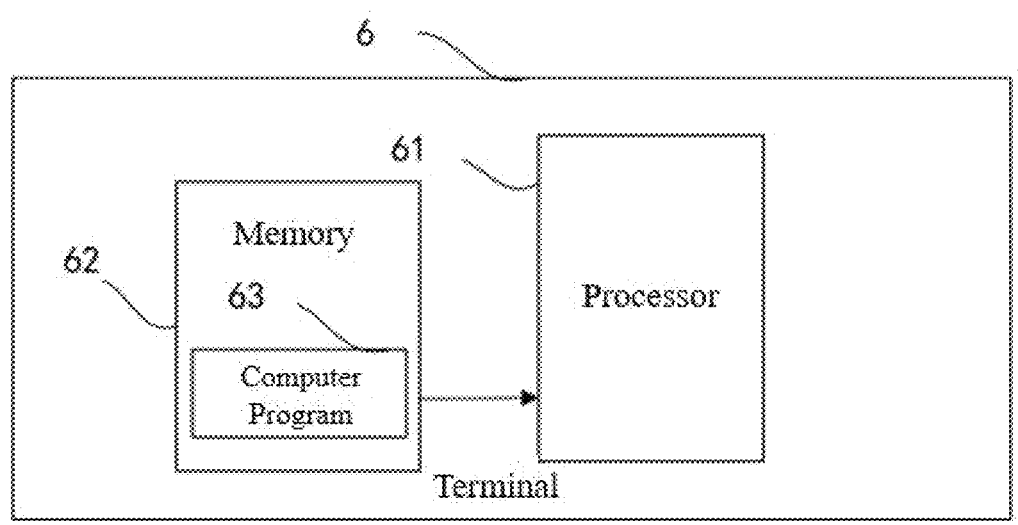
FIG. 10 is a diagram of a terminal provided by an embodiment of the present disclosure.

FIG. 10 is a diagram of an AP provided by an embodiment of the present disclosure. As shown in FIG. 10, the AP 6 of this embodiment includes a processor 61, a memory 62, and a computer program 63 stored in memory 62 and executable on the processor 61. The computer program 63, when executed by processor 61, implements the steps in various embodiments of the above transmit power adjusting methods.

The present disclosure also provides a readable storage medium having stored therein a computer program which, when executed by a processor, is used to implement the method provided by the above various embodiments.

Among other things, the readable storage medium may be either a computer storage medium or a communication medium. Communication media includes any media that facilitates the transfer of computer programs from one place to another. Computer storage media may be any available media that may be accessed by general-purpose or special-purpose computers. For example, a readable storage medium is coupled to a processor so that the processor may read information from and write information to the readable storage medium. Of course, the readable storage medium may also be an integral part of the processor. The processor and the readable storage medium may be located in an Application Specific Integrated Circuit (ASIC). In addition, the ASIC may be located in a user equipment. Of course, the processor and the readable storage medium may also exist as separate components in a communication device. The readable storage medium may be read-only memory (ROM), random access memory (RAM), CD-ROM, magnetic tape, floppy disk, optical data storage device and the like.

The present disclosure also provides a program product comprising execution instructions stored in a readable storage medium. At least one processor of a device may read the execution instructions from the readable storage medium, and the execution of the execution instructions by the at least one processor enables the device to implement the smart antenna scheduling method provided in the above various embodiments.

In the above embodiments of device, it should be understood that the processor may be Central Processing Unit (CPU), or other general processor, Digital Signal Processor (DSP), Application Specific Integrated Circuit (ASIC), etc. The general processor may be a microprocessor or the processor may be any conventional processor, etc. The steps of the method disclosed in conjunction with the present disclosure may be directly embodied as the completion of execution by a hardware processor, or the completion of execution by a combination of hardware and software modules in the processor.

The above embodiments are only used to illustrate the technical schemes of the present disclosure, but not to limit it; although the present disclosure has been described in detail with reference to the foregoing embodiments, it should be understood by those skilled in the art that it is still possible to modify the technical schemes recited in the foregoing various embodiments, or to substitute part of the technical features with equivalents; while such modifications or substitutions do not make the essence of respective technical schemes deviate from the spirit and scope of the technical solutions of various embodiments of the present disclosure, and should be included in the protection scope of the present disclosure.

What is claimed is:

1. A transmit power adjusting method, comprising:
sending, in response to a successful contention for a channel, a target frame including a transmit power control (TPC) report control field, wherein the target frame is any one of QoS Data frame, QoS Null frame and management frame, and the TPC report control field indicates a first transmit power for transmitting the target frame; and
receiving a MAC layer protocol data unit (MPDU), wherein a second transmit power for transmitting the MPDU is at least partially based on the first transmit power,
wherein a +HTC/Order subfield in a frame control field of the QoS Data frame, QoS Null frame and management frame comprises an existence of high throughput (HT) control field, and bits B0 and B1 of the HT control field are both 1, and an A-Control subfield in the HT control field includes one or more control subfields, wherein one of the one or more control subfields comprises the TPC report control field.

2. The method according to claim 1, wherein the sending a target frame including a transmit power control (TPC) report control field further comprises:
sending, in response to reaching of a preset time or detection of a change in link condition, a target frame including a transmit power control (TPC) report control field.

3. The method according to claim 1, wherein the TPC report control field includes a control ID and TPC report information, the TPC report information includes first transmit power and link margin information, and the control ID indicates that the control field carried in the target frame is a TPC report control field.

4. The method according to claim 1, wherein the determination of the second transmit power comprises:
determining a first transmit power based on the TPC report control field;
calculating a difference between the first transmit power and the received power of the target frame;
taking the difference as a path loss; and
determining the second transmit power based on the path loss.

5. The method according to claim 1, wherein the method is performed by an AP or an STA.

* * * * *